March 16, 1965  M. W. OLSON ETAL  3,173,978
MANUFACTURE OF PRODUCTS FROM PLASTISOLS
Original Filed May 15, 1959
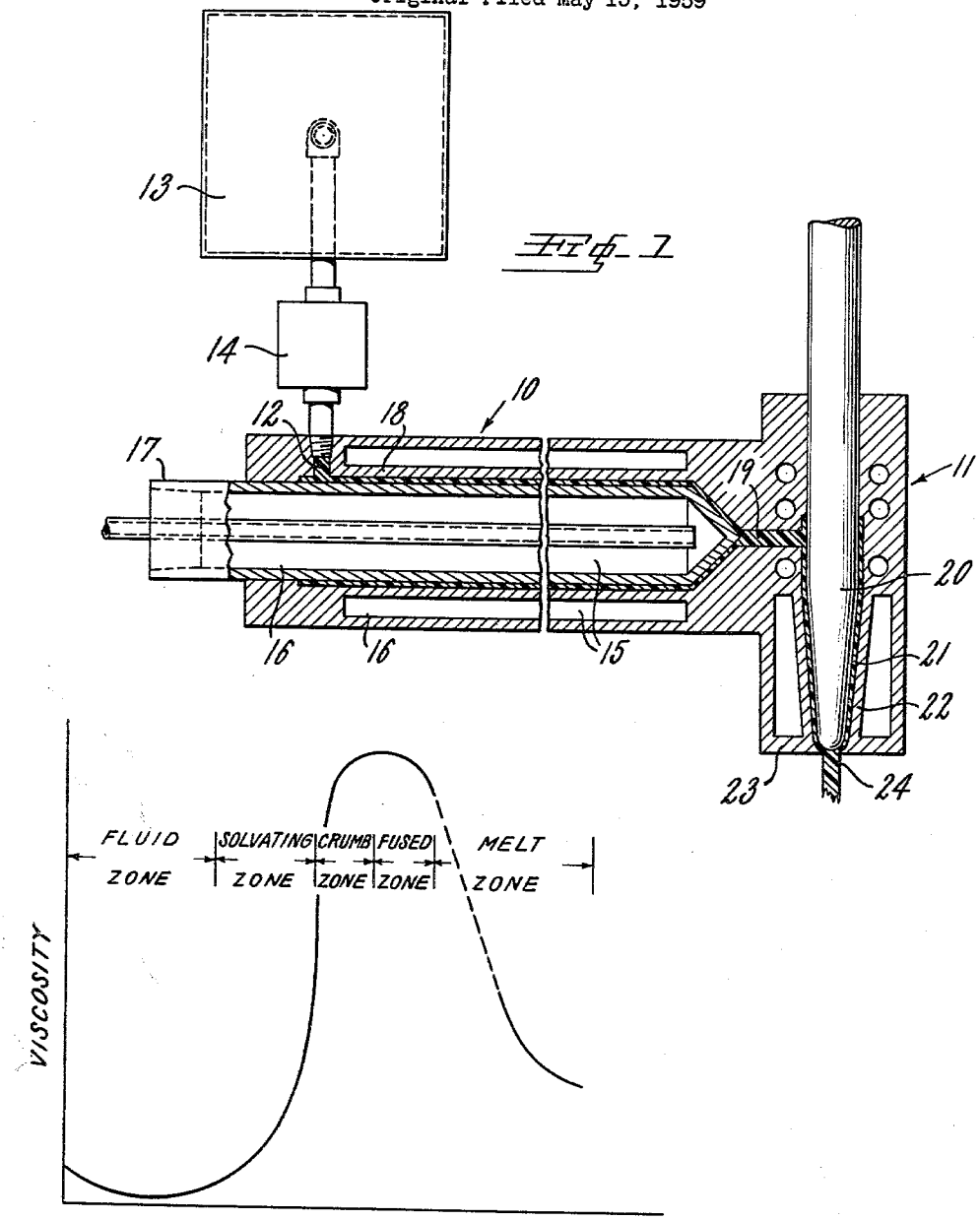
CONSTANT SHEAR PLASTISOL VISCOSITY CURVE
INVENTORS
MARK W. OLSON
VALMAR FOURNIER
IRA D. DOBBS
BY Arthur L. Whinston
ATTORNEY United States Patent Office 3,173,978
Patented Mar. 16, 1965

3,173,978
MANUFACTURE OF PRODUCTS FROM
PLASTISOLS
Mark W. Olson, Allendale, Valmar Fournier, Wallington, and Ira D. Dobbs, Allendale, N.J., assignors to United States Rubber Company, New York, N.Y., a corporation of New Jersey
Continuation of abandoned application Ser. No. 813,414, May 15, 1959. This application Mar. 28, 1962, Ser. No. 185,493
3 Claims. (Cl. 264—279)

This application is a continuation of our prior copending application, Serial No. 813,414, filed May 15, 1959, now abandoned.

This invention relates to a new and useful method of forming plastic articles and more particularly to a method of forming plastic articles by fusing a plastisol prior to the final shaping operation.

The usual procedure employed in manufacturing articles from polyvinyl chloride resin plastisols contemplates first dispersing the resin particles in the liquid plasticizer and then pouring the dispersion into a mold in the final shape of the desired article. Heat is then applied to the mold to gel, solvate and fuse the resin particles of the plastisol in that order. This is true whether the final product is to be a solid plastic article or a coated fabric.

In U.S. patent application Serial No. 678,403 filed August 15, 1957, now Patent No. 3,051,995, there is disclosed a method of manufacturing articles from plastisols in which the partially solvated resin particles in the plasticizer fluid are heated to a temperature where solvation is rapid and gellation would normally occur. However, by suitably agitating the heated plastisol, gel formation is prevented and a fully solvated, smearable paste is thereby obtained. This paste, it was disclosed, will set to a stiff gel when the agitation is arrested, thus permitting the paste-like material obtained to be employed in various manners in the manufacture of useful products. This method of solvating the resin particles in the liquid plasticizer without causing gellation delays the shaping operation, but decreases the ultimate mold cycle. It is still necessary, however, when using the method of that disclosure, to heat the product after it has been allowed to gel, thereby to fuse the resin particles.

In U.S. Patent No. 2,855,631 there is disclosed a method of extruding a polyvinyl resin plastisol which comprises heating the vinyl plastisol mixture to fusion temperature within the barrel of an extruder and subsequently extruding the fused material. The disclosure uses a heating fluid to bring the temperature of the plastisol up to the fusion level. In the method of this patent heat is transferred to the plastisol from the surface inwardly. Thus, plastisol material near the surface will be at the fusion temperature for a much longer period of time than will material in the interior. Raising the temperature of the plastisol material to a point much above the fusion temperature is, thus, precluded, because of the danger of scorching or otherwise decomposing the plastic.

It is an object of the present invention to permit the manufacture of products from plastisols using fully fused but liquid plastisol, so that after a very short interval of cooling, the final article may be achieved. It is a further object of the present invention to decrease the time required for plastisol product formation even further than that contemplated by the above-mentioned patent application, Serial No. 678,403, now Patent No. 3,051,995.

It is a further object of the present invention to permit the formation of articles or products from plastisols which have been raised to a point well above their fusion temperature.

It is an object of the present invention to provide a method of raising a plastisol to a point substantially above its fusion temperature, which method minimizes the length of time at which the material is held at the desired high temperature.

It is a further object of the present invention to form products from fused plastisol material which has been raised to a temperature at which the material is sufficiently liquid to be able to flow easily under its own weight.

It is a further object of the present invention to provide a method which permits intermittent molding operations using fused plastisol materials or low-pressure molding or coating of sheet or fabric materials using fused plastisols.

It is a further object of the present invention to permit the encasement of delicate objects in resin plastisols by means of a low-pressure molding process.

These and other objects are achieved in this invention by intensely agitating a substantially fully solvated but ungelled flowable plastisol paste thereby to heat the paste to a point substantially above the fusion temperature of the plastisol. This high-temperature fused plastisol can then be shaped into any desired form by means of extrusion, molding or other similar methods, or it may be coated on fabrics or other sheet material. After a short period of cooling, the final article is complete, thus significantly reducing the time required for product formation.

As the temperature of a plastisol approaches the fusion temperature, it begins to set up to a stiff paste. As the intense agitation or mechanical working continues to raise the temperature, the viscosity of the plastisol begins to decrease and a liquid material is again obtained. It can be seen that the viscosity of the fused material varies with the temperature achieved by the agitation and that the viscosity may be varied depending on the ultimate use desired.

The invention will be further understood by referring to the following specification taken in conjunction with the annexed drawing, in which FIG. 1 is a schematic drawing illustrating the operation of the invention, and FIG. 2 is a plastisol viscosity curve illustrating the relationship between plastisol viscosity and temperature at constant shear.

The method essentially contemplates first solvating the resin particles in the liquid plasticizer without causing gellation and then intensely agitating these solvated resin particles to heat them to a point above the fusion temperature in order to achieve a fused material of predetermined viscosity. An apparatus suitable for performing this process comprises, consequently, a solvator 10 for solvating the resin particles in the liquid plasticizer without permitting gellation and a turboheater 11 for intensely agitating the fully solvated, smearable paste which issues from the solvator.

As illustrated in FIG. 1, plastisol 12 is pumped from a reservoir 13 by means of a positive delivery pump 14 into and through a solvator 10 and turboheater 11, respectively. The operation of the solvator 10 is fully described in the above-mentioned patent application, Serial No. 678,403. A turboheater suitable for the purpose is described in U.S. Patent No. 2,742,669, which patent describes an apparatus suitable for raising a stream of moving viscous plastic material to a uniformly elevated temperature in a relatively short time by subjecting it to intense mechanical working in a restricted space. The temperature of the plastic is raised by conversion of the mechanical energy expended on the plastic into thermal energy, by reason of the relatively great internal friction of the viscous plastic.

The plastisol 12 is heated to its gellation temperature as it travels through the solvator 10 by the conduction of heat from a heat transfer fluid 15 which is circulated throughout suitably located cavities 16 in the solvator 10. The heat applied promotes solvation which would normally convert the plastisol material into a relatively stiff, single phase gel. The plastisol is prevented from assuming its inherent gelled physical state by the continuous revolving of a rotor 17 within the solvator housing 18. Thus, the plastisol material 12 in the solvator is continuously subjected to shear to counteract or prevent gel formation. A smooth, fully solvated, smearable paste 19 having a viscosity considerably greater than the viscosity of the original plastisol mixture 12 issues from the solvator 10 into the turboheater 11.

The turboheater 11 contains a frusto-conical rotary spindle 20 which is capable of high-speed rotation. The fully solvated, relatively viscous paste 19 is, therefore, subjected to intense shearing as it passes through the tapered passageway 21 between the spindle 20 and the turboheater housing 22. The shearing action in the turboheater is at a rate far greater than that encountered by the plastisol in the solvator. The plastic mass is heated by internal friction uniformly in a very brief period of time by the conversion of mechanical energy into heat. This causes the solvated plastisol paste to be heated above its normal gellation temperature steadily until it reaches and eventually goes beyond the temperature at which it is completely fused. The turboheater jacket 23 itself may also be heated to minimize heat loss from the plastisol to the outside, but if so the jacket temperature is kept below the temperature at which the plastisol could be damaged by contact therewith.

As shown in FIG. 2, the initial viscosity of plastisol viscosity then increases rapidly in the solvating zone and, thus, the plastisol enters the turboheater 11 as a relatively viscous material. The viscosity of the solvated plastisol continues to increase until it reaches the temperature at which it is completely fused. Above this temperature, the viscosity decreases by the further addition of heat until the fused mass is eventually at a much lower viscosity than either the fully-solvated paste or the initially fused material.

This heat-softened, fused, low-viscosity plasticized polyvinyl chloride resin material 24 can then be readily formed if directed through a die, smeared onto a fabric or accumulated in a mold at extremely low applied pressure.

As has been mentioned previously, the time during which the fused plastisol material is kept at the desired high-temperature state has been reduced to an absolute minimum, thus decreasing the danger of scorching or otherwise decomposing the material. Conventional methods of applying an extremely high surface temperature to raise the fused plastisol to this high temperature would be impractical because of the low heat conductivity and high viscosity of the plastisol material. The surface material, being at the fusion temperature much longer than the average material in the interior, would have a much longer heat history and would tend to scorch.

Fusion occurs in the usual plastisol material at about a temperature of 350° F. As shown in FIG. 2, a higher temperature merely serves to soften the already fused plastisol material. However, it should be kept in mind that the length of time at which fused plastisol is maintained at a high temperature is particularly critical. This can be seen from the following tabulation of scorch times for a plastisol containing 100 parts of polyvinyl chloride resin, plastisol grade; 100 parts of dioctyl phthalate plasticizer; 20 parts of whiting; and 3 parts of stabilizer:

| Temperature: | Scorch time (approximate) |
| --- | --- |
| 400° F. | 15 minutes |
| 450° F. | 5 minutes |
| 500° F. | 1 minute |
| 550° F. | Instantaneous |

(Scorch time refers to the length of time at the particular temperature before discoloring or decomposition begins.)

Thus, it can be seen that although it is very desirable to be able to work with high-temperature fused plastisol in that its viscosity is considerably lower than that of the initial fused state, the length of time at which this fused material may be maintained at the high temperature is especially critical. The method of this invention, in that it raises the viscous plastisol to a uniformly elevated temperature in a relatively short time by subjecting it to intense mechanical working, is therefore quite advantageous. It minimizes the length of time at which the fused material is held at the desired high temperature, thus permitting a higher temperature than would be possible with a means that heats more slowly. The method of this invention heats the fused plastisol material to a temperature that permits it actually to flow under a force no greater than its own weight.

From FIG. 2 it can be seen that the viscosity of the fluid, fused plastisol material varies sharply and inversely with the temperature. This characteristic enables the process to be self-regulating with regard to heat input within the turboheater 11 itself. As the temperature of the fused mass rises due to the transformation of the mechanical energy of the rotating spindle 20 into heat, the viscosity of the mass decreases. As the viscosity of the mass decreases, the resistance of the mass to the rotation of the spindle 20 decreases, and, hence, the amount of energy transformed into heat decreases. This continues until more heat is lost through the walls of the turboheater housing 22 than is gained from the transformation of mechanical energy in the interior. But as the mass begins to cool, the viscosity again increases and more heat is absorbed. Thus, it can be said that the fusing process in the turboheater 11 is self-regulating and prevents any overheating of the material.

This relationship permits interrupting the flow of material from the turboheater as is required in normal injection molding operations. Whereas any cessation in the continual flow of material from a unit which heats by direct contact with a surface held at an extremely high temperature would tend to result in scorching or other decomposition of the plastic material, such interruptions do not have any such deleterious effect in the present method, as there can be no danger of excessive heat build-up within the turboheater. The absence of any excessively hot metallic surface in contact with the fused plastisol material prevents any deterioration that would occur using conventional methods. As has been mentioned previously, the walls 23 of the turboheater may be heated in order to minimize heat loss therethrough, but the temperature is chosen so that there can be no danger of scorching the plastisol upon contact therewith for reasonable periods of time.

Furthermore, a method of heating fused plastisol material by subjecting it to contact with a high-temperature surface would tend to form a fused skin adjacent this surface, which skin would have to be scraped off constantly to keep the process going. Some type of screw or other scraping mechanism would have to be employed. Thus, another advantage of the method of the present invention is that the power requirement is kept low.

We find it essential that a solvator be employed when working with the usual type of polyvinyl chloride resin plastisol material. As can be seen from FIG. 2, the viscosity of the fully solvated material is considerably higher than the initial viscosity of the plastisol. The solvator is required in order to raise the viscosity of this original plastisol to a viscosity at which the turboheater can operate efficiently. As can be readily understood, if the turboheater were operated at the extremely high speeds necessary to heat the low viscosity material, the turboheater itself would be prone to overheat and the process would be difficult to control. The low viscosity of the original plastisol material requires that the process be accomplished in two steps, solvator followed by turboheater, as above described.

If, however, a sufficiently viscous plastic material is used, as for example, a plastisol having an initial viscosity greater than 10,000 centipoises, the solvator might be eliminated. We could then introduce the ungelled material directly into the turboheater which would solvate, gel and fuse it all in one continuous operation, thus permitting the manufacturing procedures to be followed substantially as disclosed herein.

The high-temperature, low viscosity, fused plastisol material may be used to form a variety of products. For example, it is possible to pour the high-temperature, low viscosity fused material directly into a mold. After allowing about one minute for cooling, the final molded article may be removed. It is also possible to extrude the fused material through a shaping die to form a continuous linear product.

It has also been learned that the viscosity of this high-temperature fused plastisol is sufficiently low to produce a satisfactory bond with fabrics at very low applied pressures. It can be smeared on to produce a coated fabric at pressures as low as 25 p.s.i., which is considerably less than is usually encountered in calendering operations. In the manufacture of canvas footwear, the high-temperature fused material may be injected at normal pressure rates into an outsole mold, with the fabric and the mold preheated only to approximately 120–150° F. Again the pressures required can be as low as 25 p.s.i., which is considerably lower than required by present techniques.

Poorly supported objects or fragile or delicate assemblies can be encased in plastisol material without excessive distortion by utilizing this low viscosity fused material. The objects to be encased are first placed in the desired position in a mold and then the high-temperature, low-viscosity material is introduced. Because of the low pressures required, disarrangement or distortions of the fragile objects are reduced to an absolute minimum. This method, known as "potting," finds great utility in the manufacture of delicate electrical assemblies.

Proper conditions are required in order to process a plastisol into a fused, superheated and low viscosity plasticized polyvinyl chloride resin mixture which will be ideally conditioned for shaping or forming into final product configuration. The operating conditions for successfully processing a typical plastisol made with 50 parts by weight of VR50 plastisol grade polyvinyl chloride resin, marketed by Naugatuck Chemical Division of United States Rubber Company, 45 parts by weight of dioctyl phthalate plasticizer, 5 parts by weight of Paraplex G–62, a high molecular weight plasticizer available from Rhom and Haas Company, 3 parts by weight of Mark M, a barium-cadmium complex and 1.5 parts by weight of Mark PL, a zinc complex (the last two ingredients being heat and light stabilizers marketed by Argus Chemical Corporation), are as follows:

Fusion temperature of plastisol _____ App. 350° F.
Pump data:
    Rate _____ 100 grams/minute.
    Pressure _____ 25 to 300 p.s.i. (depending on exit nozzle size, shape and temperature).

Solvator data:
    Size _____ 1" diam., 6" length, .050" clearance.
    Rotor Speed _____ 100 to 200 r.p.m.
    Jacket Temperature _____ 230° F.
    Solvated Paste Temperature ___ 220° F.
    Initial Plastisol Viscosity _____ 1000 centipoises, approximately.
    Solvated Paste Viscosity _____ Greater than 10,000 centipoises.
Turboheater data:
    Size _____ 5/8" x 1/4" diam., 2" length, .050" clearance.
    Spindle Speed _____ 3,000 r.p.m.
    Jacket Temperature _____ 350° F.
    Stock Delivery Temperature ___ 460° F.
    Stock Delivery Viscosity _____ Less than 5,000 centipoises.

Pumping rates are limited predominantly by the physical dimensions of the processing equipment. Viscosities, operating and impressed temperatures, and rotational speeds of the solvator rotor 17 and the turboheater spindle 20 will vary over a wide range and must be adjusted for effective treatment of each plastisol compound processed. The forming viscosity desired is somewhat higher for an extrusion operation than for injection molding, and operating conditions must be adjusted accordingly.

Generally, the turboheater 11 is as described in the above-mentioned U.S. Patent No. 2,742,669. It must be a cylinder having a rotatable rotor or spindle 20 extending through it with a relatively small clearance between the spindle 20 and the housing 22. The basic requirements are that the shear rate must be from 60 to 9,600 $(\text{sec.})^{-1}$ and preferably at least 500 $(\text{sec.})^{-1}$. The required time of plastisol contact with this shear rate shall be from at least 1/4 second to about 30 seconds, with a preferred maximum of about 5 seconds.

The term "shear rate" as used herein is defined as the surface speed in inches/second divided by the clearance in inches. The surface speed is that of the spindle 20 and is equal to the spindle circumference, measured in inches, multiplied by the speed of rotation, expressed in revolutions per second. Thus, the units of surface speed are inches/second and the units of clearance are inches, resulting in shear rate being expressed in $(\text{sec.})^{-1}$. The clearance involved is the distance in inches measured radially from the spindle surface to the housing wall. This clearance is not considered a critical limitation in view of the basic shear rate formula given above, but it generally ranges from about .01" to about .125".

The term "plastisol" as used herein refers to a dispersion of a resin in a liquid plasticizer, which dispersion may be irreversibly heat-set into a desired shape. Typical of such plastisols would be a dispersion of polyvinyl chloride resin in dioctyl phthalate. While polyvinyl chloride resin materials are a preferred material for use in accordance with this invention, other materials may also be satisfactory. All kinds of stabilizers and the like may also be added to the resin and plasticizer mixture. The invention is applicable to plastisols generally and is not limited to the particular data furnished in the above-mentioned example. Many variations are possible within the scope of this invention which is limited only as may be necessitated by the following claims.

Having thus described our invention, what we claim and desire to protect by Letters Patent is:

1. A method of making plastic articles from a liquid plastisol comprising subjecting a substantially fully solvated ungelled plastisol paste consisting essentially of the original dispersed resin particles in unfused and ungelled substantially fully solvated condition in the original plasticizer to shear at a rate of from 500 to 9,600 seconds$^{-1}$ to heat said paste to a temperature at least 100° F. above its fusion temperature and then shaping said plastisol into the desired form.

2. A method of making plastic articles from a liquid plastisol comprising continuously forcing a fluid stabilized polyvinyl chloride plastisol in which the resin particles are but partially solvated through a heated solvating zone under imposed agitation sufficient to keep the plastisol ungelled and fluid while in transit through said zone, but forming a fully solvated smearable polyvinyl chloride paste, thereafter subjecting said paste to shear at a rate of from 500 to 9,600 seconds$^{-1}$ to cause said paste to be heated to a temperature at least 100° F. above its fusion temperature, and then shaping the plastisol into the desired form.

3. A method of encasing fragile objects in plastisol comprising subjecting a substantially fully solvated ungelled flowable plastisol paste consisting essentially of resin particles and a plasticizer therefor to shear at a rate of from 500 to 9,600 seconds$^{-1}$ to heat said paste to a temperature at least 100° F. above its fusion temperature, introducing said plastisol into a mold containing said fragile objects, cooling said mold and removing the encased objects in the final desired form of the finished article.

References Cited in the file of this patent
UNITED STATES PATENTS

| | | |
|---|---|---|
| 2,328,125 | Buchsbaum et al. | Aug. 31, 1943 |
| 2,651,586 | Cooper et al. | Sept. 8, 1953 |
| 2,742,669 | Rhodes | Apr. 24, 1956 |
| 2,822,237 | Iwamae | Feb. 4, 1958 |
| 2,855,631 | Rowley | Oct. 14, 1958 |
| 2,876,497 | Alexander | Mar. 10, 1959 |
| 2,953,818 | Bartron | Sept. 27, 1960 |